Patented Feb. 4, 1936

2,029,623

UNITED STATES PATENT OFFICE 2,029,623

WORKING UP OF NATURAL AND INDUSTRIAL SALT MIXTURES

Carl Kircher and Fritz Mueller, Ludwigshafen-on-the-Rhine, and Hermann Suessenguth, Mannheim, Germany, assignors to I. G. Farbenindustrie Aktiengesellschaft, Frankfort-on-the-Main, Germany No Drawing. Application November 2, 1929, Serial No. 404,507. In Germany December 20, 1928

1 Claim. (Cl. 23—40)

The present invention relates to the working up of natural and industrial salt mixtures.

The working up of solid natural or industrial salt mixtures is frequently very difficult and is attended with great expense since the evaporation, cooling and the like of the aqueous solutions employed for this purpose consume a very great amount of energy. For the working up of salts rich in potassium, which is of great importance in practice, for example dissolving or crystallizing processes which make use of the varying solubility of the single salts at different temperatures are employed. The manufacture of pure potassium chloride from minerals, for example carnallite ($KCl, MgCl_2, 6H_2O$), hard salt $$(KCl, NaCl, xMgSO_4, H_2O)$$

or kainite ($KCl, MgSO_4, 3H_2O$), is rendered very difficult by the sodium chloride which is mixed with the minerals. Moreover, the recovery of potassium nitrate from industrially prepared mixtures, such as are obtained for example by the conversion of ammonium nitrate with potassium chloride, has only been possible hitherto by troublesome methods in aqueous solutions.

We have now found that solid natural or industrial salt mixtures containing constituents which are soluble in liquid ammonia can be worked up in a simple manner by extracting them with liquid ammonia. This process has considerable advantages in contrast to those hitherto employed. Thus, for example, in the working up of natural potassium salts by the method of crystallization from aqueous solutions which hitherto has been usual a considerable portion of the potassium chloride remained behind dissolved in the mother liquor and could not be recovered therefrom in an economical manner, while by working by the process in accordance with the present invention the potassium chloride remains undissolved and can be recovered without the expense of evaporation and drying. The constituents dissolved in the liquid ammonia can be separated without the expenditure of energy by simply releasing the pressure, or when several constituents are dissolved they may be separated from each other in a simple manner by consecutive fractional releasing of the pressure, and are thus obtained in the dry state, a further treatment therefore being unnecessary. The fact that the operation may be carried out at comparatively low temperatures, for example ordinary or slightly elevated temperatures, so that attack on the apparatus only occurs to a slight degree, if at all, and the fact that the process remains the same for a great variety of initial materials constitute further advantages.

In order to reduce the solubility of the salts which remain behind, to a greater or smaller extent or even to nought, in the process in accordance with the present invention, a solution in liquid ammonia of salts which reduce the solubility of the said salts may be employed as the extraction agent. For example, when separating ammonium chloride from potassium nitrate, the solubility of the potassium nitrate is considerably reduced by an addition of ammonium nitrate to the liquid ammonia. Moreover, in order to avoid working at very high pressures a mixture of liquid ammonia with ammonium salts, in particular with ammonium nitrate, may be employed instead of the pure liquid ammonia.

The eployment of the process in accordance with the present invention is not restricted merely to the working up of potassium salts, but is of practical importance in many other industrial processes which are based on a separation of salt mixtures. For example it is possible to employ the process herein described in a similar manner for the recovery of sodium salts, for example for the separation of sodium chloride and sodium nitrate, or for the separation of ammonium salts from salts other than potassium salts, for example for separating ammonium chloride and sodium carbonate.

The process may be carried out in a great variety of ways. The salt mixture to be worked up may be continually treated with fresh quantities of ammonia, the solution obtained being then further worked up, for example by fractional separation of the dissolved constituents by releasing the pressure in stages, and the ammonia employed for some other purpose. Or the process may be partially or wholly arranged in a cycle for the purpose of reducing the amounts of liquid ammonia which are necessary, for example by first treating the salt mixture which is to be separated with liquid ammonia, by separating the solution which is drawn off, from dissolved salts in a second vessel and by then leading the solvent wholly or in part back to the product which is to be lixiviated. The separation of the withdrawn solution from the dissolved salts may be effected for example by evaporating and recondensing the ammonia, or the solution may be cooled, preferably by making use of the cooling effect resulting from the evaporation of the ammonia from which the pressure has been partly released, and by returning the solution which has been rendered poorer in salt to the process after separation of the solid constituents which have separated out. In working by the latter method it is possible by proper choice of the cooling temperature to keep a part of the salts continually in solution during the process.

The following examples will further illustrate the nature of this invention, but the invention is not restricted to these examples.

Example 1

A mixture consisting of equal amounts of potassium chloride and sodium chloride is treated with liquid ammonia so that the pure liquid ammonia continually runs into the salt mixture, while the solution formed is drawn off and the ammonia removed therefrom by evaporation and after condensation is led back into the process. After some time the salt mixture which originally contained 50 per cent of potassium chloride contains 80 per cent thereof.

Example 2

Potassium chloride is converted with ammonium nitrate into potassium nitrate and ammonium chloride in the manner already known. The salt mixture obtained is first extracted with liquid ammonia containing ammonium nitrate in order to avoid a reversal of the reaction and then with pure liquid ammonia. A product is thus obtained which contains practically no nitrogen in the form of a constituent of an ammonium radical and only traces of chlorine and which thus consists of practically 100 per cent potassium nitrate.

Example 3

100 kilograms of sodium nitrate containing 20 per cent of sodium chloride are treated for 5 hours with liquid ammonia in a pressure vessel. By evaporation of the resulting solution, 80 kilograms of sodium nitrate containing only traces of sodium chloride are obtained. The residue from the extraction is practically pure sodium chloride.

What we claim is:—

The process which comprises subjecting a mixture of potassium nitrate and ammonium chloride to extraction with anhydrous liquid ammonia containing ammonium nitrate and then with substantially anhydrous liquid ammonia and removing the solution thereby obtained from the remainder.

CARL KIRCHER.
FRITZ MUELLER.
HERMANN SUESSENGUTH.